(12) United States Patent
Young et al.

(10) Patent No.: US 11,034,428 B2
(45) Date of Patent: Jun. 15, 2021

(54) ANTI-MICROBIAL DECORATIVE LAMINATE

(71) Applicant: The Boeing Company, Chicago, IL (US)

(72) Inventors: Stephen Young, Los Alamitos, CA (US); Kevin Griffith Swanson, Lake Forest Park, WA (US); Daniel Nunes, Seattle, WA (US); Jason Drexler, Brier, WA (US)

(73) Assignee: The Boeing Compny, Chicago, IL (US)

( * ) Notice: Subject to any disclaimer, the term of this patent is extended or adjusted under 35 U.S.C. 154(b) by 257 days.

(21) Appl. No.: 16/101,341

(22) Filed: Aug. 10, 2018

(65) Prior Publication Data

US 2020/0047868 A1 Feb. 13, 2020

(51) Int. Cl.
| | |
|---|---|
| B64C 1/06 | (2006.01) |
| B60R 13/02 | (2006.01) |
| B32B 15/082 | (2006.01) |
| B32B 27/20 | (2006.01) |
| B32B 27/30 | (2006.01) |
| B32B 38/00 | (2006.01) |

(52) U.S. Cl.
CPC ............. B64C 1/066 (2013.01); B60R 13/02 (2013.01); *B32B 15/082* (2013.01); *B32B 27/20* (2013.01); *B32B 27/304* (2013.01); *B32B 38/145* (2013.01); *B32B 2307/4023* (2013.01); *B32B 2307/4026* (2013.01); *B32B 2307/412* (2013.01); *B32B 2307/7145* (2013.01); *B32B 2605/003* (2013.01)

(58) Field of Classification Search
CPC ........ B60R 13/02; B64C 1/066; B32B 15/082
See application file for complete search history.

(56) References Cited

U.S. PATENT DOCUMENTS

| | | | |
|---|---|---|---|
| 5,085,921 A | 2/1992 | Jayarajan | |
| 5,380,695 A | 1/1995 | Chiang et al. | |
| 5,976,671 A | 11/1999 | Gleim | |
| 6,092,915 A | 7/2000 | Rensch | |
| 6,170,564 B1 * | 1/2001 | Steele | ............... C09D 1/00 106/15.05 |
| 8,540,914 B2 | 9/2013 | Wilde et al. | |
| 8,569,396 B1 | 10/2013 | Sloan | |

(Continued)

FOREIGN PATENT DOCUMENTS

| | | |
|---|---|---|
| CN | 106703334 A | 5/2017 |
| EP | 1851272 B1 | 8/2008 |
| WO | 2006089059 A1 | 8/2006 |

OTHER PUBLICATIONS

European Patent Office, Extended European Search Report regarding European Patent Application No. 19191004.1-1107, dated Dec. 17, 2019, 7 pages.

*Primary Examiner* — Joseph D. Pape
(74) *Attorney, Agent, or Firm* — Kolisch Hartwell, P.C.

(57) ABSTRACT

A decorative laminate is disclosed, including a first laminate layer containing an anti-microbial agent and a second laminate layer. A decorative layer is disposed selectively between the first laminate layer and the second laminate layer. The first and second laminate layers include a thermoplastic fluoropolymer material. The first laminate layer, the decorative layer, and the second laminate layer are laminated together to form the decorative laminate, which is configured for application to a structural component.

20 Claims, 7 Drawing Sheets

(56) References Cited

U.S. PATENT DOCUMENTS

| | | |
|---|---|---|
| 8,986,816 B2 | 3/2015 | Zielinski et al. |
| 9,718,302 B2 | 8/2017 | Young et al. |
| 9,855,721 B2 | 1/2018 | Drexler et al. |
| 10,682,833 B2 * | 6/2020 | Weinberg .............. B29C 70/465 |
| 2002/0182957 A1 | 12/2002 | Levenda |
| 2008/0050597 A1 * | 2/2008 | Colombo ................ B32B 27/36 |
| | | 428/422 |
| 2014/0339298 A1 | 11/2014 | Lacoste et al. |
| 2017/0080747 A1 | 3/2017 | Young et al. |

\* cited by examiner

ANTI-MICROBIAL DECORATIVE LAMINATE

FIELD

This disclosure relates to laminates and methods for making laminates. More specifically, the disclosed examples relate to decorative laminates.

INTRODUCTION

Decorative laminates are used in a wide variety of applications, including for surfaces of walls, countertops, and other structures, such as interior structural components of aircraft. For example, decorative laminates may be applied to the surfaces of such aircraft interior structural components as cabin interior sidewall and ceiling panels, floor panels, stowage bins, lavatory and galley panels and structures, bulkhead partitions, window shades, and other aircraft interior structural components.

During the course of typical usage, people may contact the aircraft interior surfaces and transfer bacteria or other microbial traces to the decorative laminates. Additionally, luggage, food products, non-sterile air, etc. may transfer microbial traces or substances promoting microorganism growth. Inhibiting such growth and/or eliminating such microorganisms is desirable to improve cleanliness and prevent spread of microorganisms. Some anti-microbial paints are used for this purpose, but are aesthetically and functionally limited, and may obscure design elements when applied to decorative laminate. Graphics or complex patterns applied in paint may lack durability and be difficult and/or expensive to produce.

SUMMARY

The present disclosure provides systems, apparatuses, and methods relating to anti-microbial decorative laminates. In some examples, a decorative laminate can include a first laminate layer containing an anti-microbial agent and a second laminate layer. A decorative layer may be disposed selectively between the first laminate layer and the second laminate layer. The first and second laminate layers can include a thermoplastic fluoropolymer material. The first laminate layer, the decorative layer, and the second laminate layer can be laminated together to form the decorative laminate, which may be configured for application to a structural component.

In some examples, a decorative laminate system can include a structural component with a bonding surface and a decorative laminate applied to the bonding surface. The decorative laminate can include a first laminate layer with a transparent appearance that contains an anti-microbial agent, and a second laminate layer with an opaque appearance. The first and second laminate layers can include a thermoplastic fluoropolymer material, and a decorative layer can be disposed between the first and second laminate layers. The decorative laminate can further include a resin layer disposed on the second laminate layer, and an adhesive layer disposed between the decorative laminate and the bonding surface of the structural component.

In some examples, a vehicle can include a structural component and a decorative laminate applied to the structural component. The decorative laminate can include a first laminate layer containing an anti-microbial agent, a second laminate layer, and a decorative layer disposed between the first and second laminate layers. The first and second laminate layers can include a thermoplastic fluoropolymer material. The first laminate layer, the decorative layer, and the second laminate layer can be laminated together to form the decorative laminate.

Features, functions, and advantages may be achieved independently in various examples of the present disclosure, or may be combined in yet other examples, further details of which can be seen with reference to the following description and drawings.

DETAILED DESCRIPTION

Various aspects and examples of an anti-microbial decorative laminate, are described below and illustrated in the associated drawings. Unless otherwise specified, a decorative laminate in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples and examples described below are illustrative in nature and not all examples and examples provide the same advantages or the same degree of advantages.

This Detailed Description includes the following sections, which follow immediately below: (1) Overview; (2) Examples, Components, and Alternatives; (3) Advantages, Features, and Benefits; and (4) Conclusion. The Examples, Components, and Alternatives section is further divided into subsections A through G, each of which is labeled accordingly.

Overview

Figure 1:
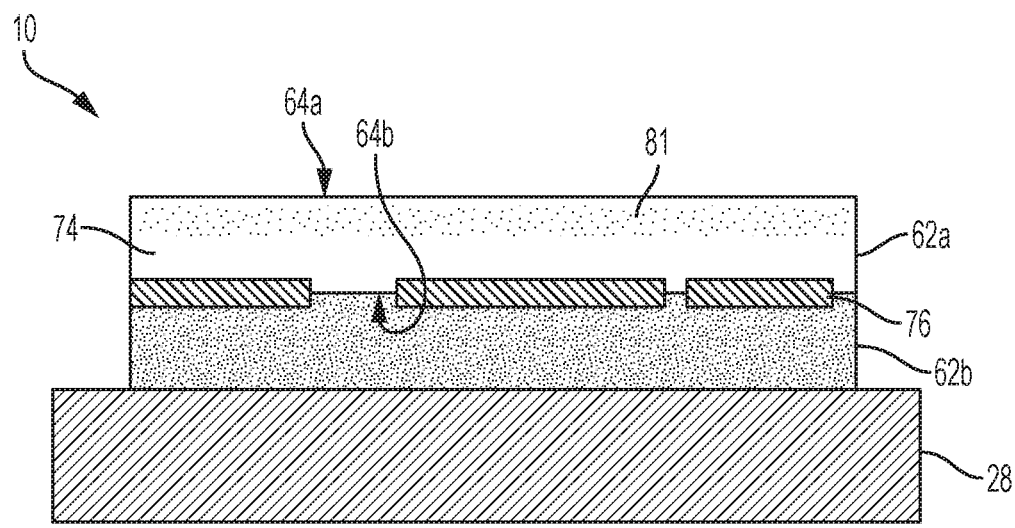
FIG. 1 is a schematic diagram of an illustrative anti-microbial decorative laminate in accordance with aspects of the present disclosure.

In general, an antimicrobial decorative laminate can include a decorative layer selectively disposed between an inner layer and an outer layer including an anti-microbial material. The outer layer can be transparent, and the inner layer can be semi-transparent or opaque. The decorative layer can include visible and/or light-activated materials arranged in a decorative and/or functional pattern. The laminate can be configured for application to a structure or structural component. FIG. 1 is a schematic diagram of an illustrative anti-microbial decorative laminate 10 applied to a structure 28.

Decorative laminate 10 includes a first layer 62a, a decorative layer 76, and a second layer 62b. Decorative layer 76 is selectively disposed between the first and second layers. As shown in FIG. 1, selectively disposed may be understood to mean that decorative layer 76 is disposed between first layer 62a and second layer 62b in some portions of decorative laminate 10, and is not disposed between the first and second layers in other portions of the decorative laminate. The first layer 62a, decorative layer 76, and second layer 62b can be laminated together to form decorative laminate 10.

Decorative layer 76 may include any inks, pigments, or other visible materials. For example, the decorative layer may be an ink pattern printed onto second layer 62b. The decorative layer can additionally or alternatively include light activated materials, as described in U.S. Pat. No. 9,718,302 which is hereby incorporated by reference in its entirety for all purposes. For instance, the decorative layer can include an ultraviolet (UV) activated pigment that is non-visible until exposed to a source of UV light. The decorative layer can be deposited in a decorative and/or functional pattern. For example, the layer can include a manufacturer logo, a barcode, and/or an alignment pattern that facilitates alignment of decorative laminate 10 during application to structure 28.

Second layer 62b includes a thermoplastic fluoropolymer material. In particular, the second layer can be a polyvinylidene fluoride film, an integral color polyvinyl fluoride film and/or a polyvinyl fluoride film adhered to an aluminum foil. The second layer can be opaque.

First layer 62a has a first side 64a and a second side 64b. First side 64a can be described as facing away from structure 28, when decorative laminate 10 is applied to the structure. Second side 64b can contact and/or face decorative layer 76. First layer 62a can be optically transparent, allowing decorative layer 76 to be visible. First layer 62a can also be transparent to ultraviolet (UV) and/or infrared (IR) light, allowing such light incident on the first layer to penetrate to decorative layer 76 and affect any light-activated materials.

First layer 62a includes a thermoplastic fluoropolymer material 74, and an anti-microbial agent 81. The anti-microbial agent can include any effective chemical agents, biological agents, and/or combinations of agents, including but not limited to bacteriostatic agents, fungistatic agents, antibiotic agents, and fungicides. For example, the anti-microbial agent can be a metal such as silver, copper, zirconium, sodium, potassium, and/or any combination thereof. As another example, the anti-microbial agent can be a phenolic such as para-tert-amylphenol (PTAP).

The anti-microbial agent 81 and thermoplastic fluoropolymer material 74 of first layer 62a can be incorporated, adhered, aggregated, or otherwise combined to form the first layer in any effective manner. The anti-microbial agent can be homogenously distributed throughout the polymer material, can be localized proximate first side 64a of the first layer, and/or can be disposed according to some pattern. The anti-microbial agent can be distributed according to effects of a manufacturing process. In the depicted example, microbial agent 81 is dispersed in thermoplastic fluoropolymer material 74 with a higher concentration toward first side 64a of first layer 62a. Such a distribution can provide desired anti-microbial effects while minimizing the required quantity of microbial agent 81.

The anti-microbial agent 81 and the polymer material can be combined in such a manner as to achieve a desired transparency of first layer 62a. For example, metal agents can be finely powdered, to minimize visual defects. In one specific possible example, the anti-microbial agent can include metal powder with a median particle size on the order of one micrometer, one nanometer, or some other size scale that minimizes visibility of the powder or that provides some other desired characteristic.

First layer 62a can be a metal-polymer nanocomposite (MPN). Powdered metal such as silver can be co-deposited with a thermoplastic fluoropolymer such as polyvinylidene fluoride to achieve a particulate polymer composite. A filling ratio and microstructure properties such as size, size distribution, and inter-cluster separation may be selected to provide desired optical, UV, and/or IR transmission. First layer 62a can include a particulate or dispersoid polymer composite with powdered metal on either a micro or macro scale.

Anti-microbial agent 81 can be deposited on first surface 64a of first layer 62a. For instance, a phenolic compound in solution can be uniformly coated onto the first layer. Alternatively, powdered metal suspended in a transparent ink can be printed onto first layer 62a in a grid pattern that provides effective anti-microbial coverage while preserving desired transparency of first layer 62a.

Anti-microbial agent 81 can be combined with the polymer material to form first layer 62a prior to lamination of the first layer to form decorative laminate 10. Anti-microbial agent 81 can be combined with the polymer material of first layer 62a subsequent to lamination of the first layer to form decorative laminate 10.

The decorative laminate 10 can further include additional layers disposed between the first layer and the decorative layer, between the decorative layer and the second layer, and/or between the second layer and the structure. Additional layers can include, for example, one or more of a resin layer, a polymer laminate layer, a decorative layer, and/or an adhesive layer.

First layer 62a can be described as an outer-most layer, disposed at a greatest distance from structure 28 when decorative laminate 10 is applied to the structure. Anti-microbial agent 81 can be disposed at first side 64a and/or on first side 64a of first layer 62a, which can be described as an outer surface of decorative laminate 10. In other words, when decorative laminate 10 is applied to structure 28, microorganisms contacting the decorative laminate can contact first side 64a of first layer 62a and anti-microbial agent 81.

A decorative laminate system can include decorative laminate 10 and one or more structures 28. A vehicle can include structures 28 and applied decorative laminate 10. Decorative laminate 10 can be applied to the structure, structural component, and/or structural composite panel of any vehicle and/or building. For example, the decorative laminate can be applied to an interior structural component of an aircraft, rotorcraft, spacecraft, watercraft, automobile, or truck. Decorative laminate also can be applied to interior structural components of a building such as bathroom counters, stall partitions, floors, informational signage, and/or doors. Generally speaking, it can be desirable to apply anti-microbial decorative laminates to any surface or structural component where microorganisms may be found.

Figure 2:
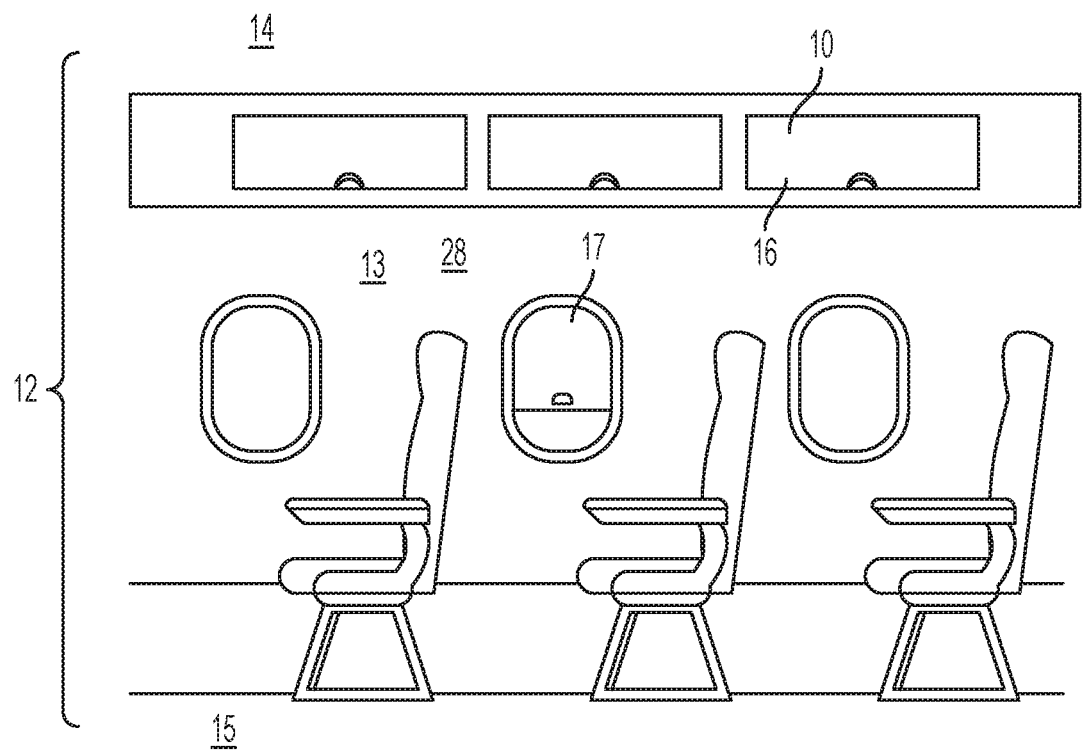
FIG. 2 is an illustration of a cabin interior of an aircraft that includes an anti-microbial decorative laminate according to the present teachings.

FIG. 2 shows an illustrative cabin interior of an air vehicle 12, including structural components 28 covered with one or more examples of an anti-microbial decorative laminate as disclosed herein, such as decorative laminate 10. The structural components 28 include cabin interior sidewall 13 and ceiling panels 14, floor panels 15, stowage bins 16, and window shades 17. Other structural components of air vehicle 12 including, but not limited to insulation barriers, moisture barriers, composite noise panels, lavatory and galley panels and structures, bulkhead partitions, and cargo bin liners can be covered by an anti-microbial decorative laminate according to the present teachings.

Examples, Components, and Alternatives

The following sections describe selected aspects of exemplary anti-microbial decorative laminates as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Anti-Microbial Decorative Laminate

Figure 3A:
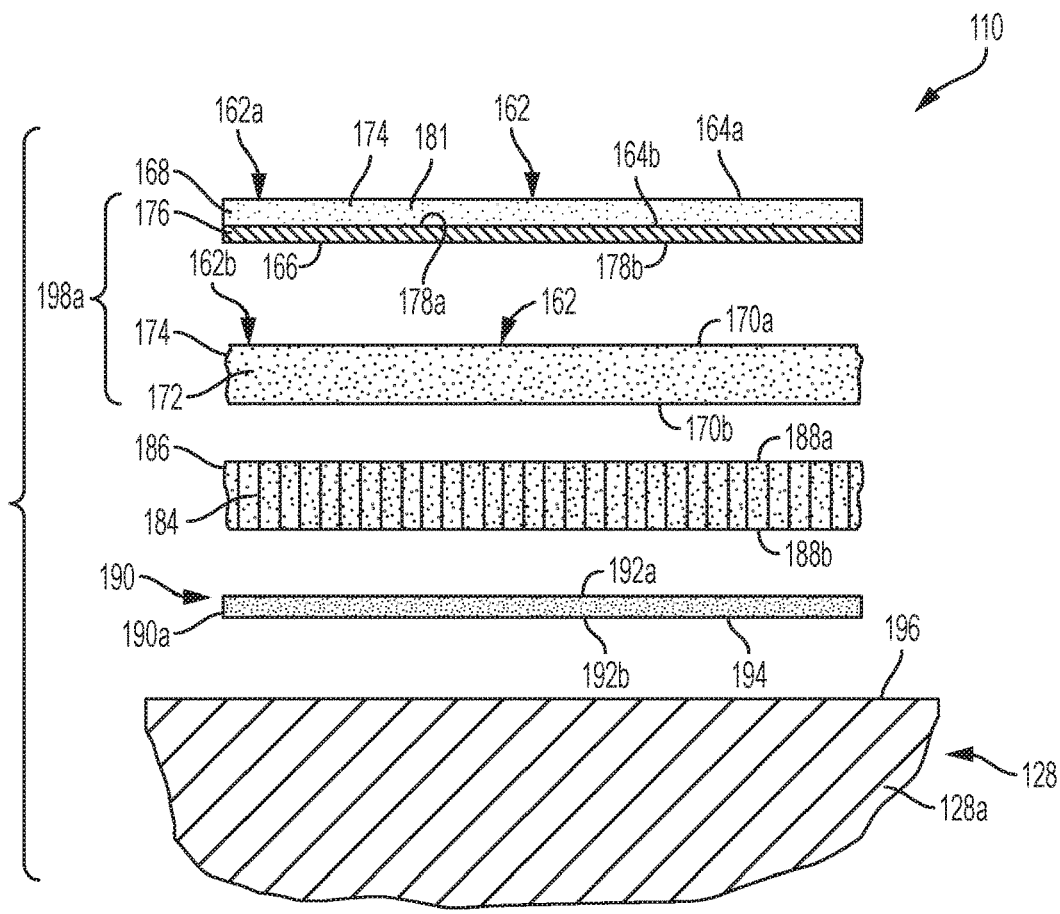
FIG. 3A is an exploded side view of an illustrative anti-microbial decorative laminate.
Figure 3B:
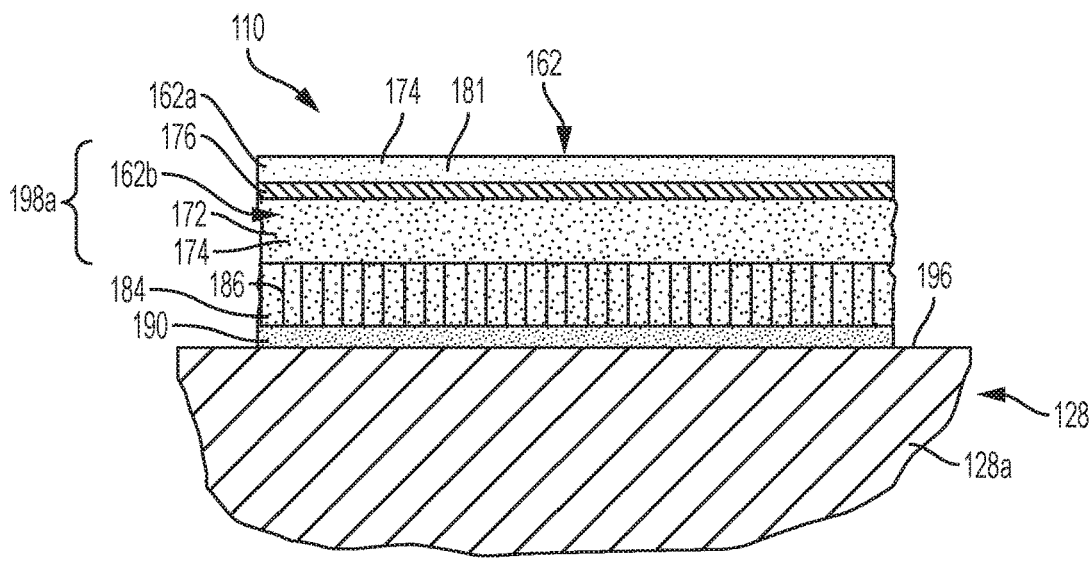
FIG. 3B is an assembled side view of the laminate of FIG. 3A.

As shown in FIGS. 3A-3B, this section describes an illustrative decorative laminate 110. Decorative laminate 110 is an example of anti-microbial decorative laminate 10, as described above. FIG. 3A is an exploded side view of decorative laminate 110, and FIG. 3B is an assembled side view of the decorative laminate. As shown, decorative laminate 110 comprises multiple laminate layers 162, including at least a first laminate layer 162a and a second laminate layer 162b. Depending on the decorative laminate 110 desired to be made, one or more additional laminate layers 162 can be included.

As further shown in FIG. 3A, the first laminate layer 162a has a first side 164a and a second side 164b. The first laminate layer 162a has a transparent appearance 168 or clear appearance, in that it will transmit light through it.

The laminate layers 162 can have a thickness in a range of from about 0.25 mil to about 5.0 mils, although other suitable thicknesses may be used. The first laminate layer 162a can have a thickness between about 1.0 mil to about 2.0 mils. Selecting a thickness within this range can promote the transparent appearance 168 of first laminate layer 162a, thereby allowing clear display of a decorative image or images. The second laminate layer 162b, and any additional laminate layers 162, can each have a thickness between about 2.0 mil to about 4.0 mils. Selecting a thickness within this range can allow use of lower-cost, widely available laminate layers, and facilitate manufacture of the decorative laminate.

In the present example, the first laminate layer 162a is comprised of a metal-polymer nanocomposite (MPN) of silver and polyvinyl fluoride (PVF). Nanoparticles of powdered silver 181 are homogenously dispersed throughout a thermoplastic fluoropolymer material 174, such as a polyvinyl fluoride (PVF) film. The nanoparticle concentration and/or fill ratio can be selected to maximize anti-microbial properties of first laminate layer 162a, but maintain desired transparency.

In the present example, the second laminate layer 162b is also comprised of a thermoplastic fluoropolymer material 174. The thermoplastic fluoropolymer material 174 can include a polyvinyl fluoride (PVF) film, polyvinylidene fluoride (PVDF) film, integral color polyvinyl fluoride (PVF) film, a polyvinyl fluoride (PVF) film/aluminum foil/adhesive material, or another suitable thermoplastic fluoropolymer material.

A polyvinyl fluoride (PVF) film that can be used is commercially available from E.I. DuPont De Nemours and Company (Wilmington, Del.) under the designation TEDLAR. (TEDLAR is a registered trademark of E.I. DuPont De Nemours and Company of Wilmington, Del.) A polyvinylidene fluoride (PVDF) film that can be used is commercially available from Avery Dennison Corporation (Glendale, Calif.) under the designation AVIMARK. (AVIMARK is a trademark of Avery Dennison Corporation of Glendale, Calif.)

The integral color polyvinyl fluoride (PVF) film comprises polyvinyl fluoride (PVF) film with decorative color incorporated into the PVF film. The polyvinyl fluoride (PVF) film/aluminum foil/adhesive material comprises a PVF film having an opaque appearance 172 combined with 0.7 mil aluminum foil combined with an adhesive material.

Polyvinyl fluoride materials are advantageous for the laminate layers 162 due to their physical toughness, chemical inertness, abrasion resistance, and consistent performance regardless of temperature changes. The polyvinyl fluoride materials are also able to receive a wide variety of inks used for printing graphics. As used herein, the term "thermoplastic fluoropolymer material" refers to polyvinyl fluoride-based materials including polyvinyl fluoride polymers (i.e., polymer formed from vinyl fluoride). The fluorinated polymer is generally a polymer, copolymer, or terpolymer of vinyl fluoride.

Laminate layers 162, such as the second laminate layer 162b can additionally or alternatively include non-polymer materials. For instance, a thermoplastic fluoropolymer material can be reinforced with glass fibers or carbon fibers. The second laminate layer 162b can include fiberglass reinforced plastic, and/or woven fiberglass. Such reinforced materials can be advantageous for use in high-traffic areas.

As shown in FIG. 3A, the second laminate layer 162b has a first side 170a and a second side 170b. The second laminate layer 162b has an opaque appearance 172 or unclear appearance, in that it will not transmit light through it.

The decorative laminate 110 further comprises a decorative layer 176 disposed selectively between the first laminate layer 162a and the second laminate layer 162b. It will be understood by those having skill in the art that when a layer is described as being "disposed selectively between" layers or "disposed on" another layer, it may be formed directly on the layer or one or more intervening layers may be provided therebetween.

In the present example, the decorative layer 176 comprises a decorative ink layer. The decorative layer 176 can comprise one or more of an ink jet printed ink, a silk screen printed ink, a pigment-based ink, a dye-based ink, a paint, a stain, a digital printed ink, or another suitable material.

The decorative layer 176 includes a first side 178a and a second side 178b. The first side 178a of the decorative layer 176 is adjacent the second side 164b of the first laminate layer 162a, and the second side 178b of the decorative layer 176 is adjacent the first side 170a of the second laminate layer 162b. The decorative layer 176 can have a thickness in a range of from about 0.25 mil to about 5.0 mils, although other suitable thicknesses can be used.

The decorative layer 176 can be deposited or applied between the first laminate layer 162a and the second laminate layer 162b. The decorative layer 176 can be printed on the second side 164b of the first laminate layer 162a to form a printed decorative material side 166. The decorative layer 176 can be deposited between the first laminate layer 162a and the second laminate layer 162b or printed onto the first laminate layer 162a via a printing process. The printing process can comprise an ink jet printing process, a silkscreen printing process, a digital printing process, or another suitable printing process.

The decorative laminate 110 further comprises a resin layer 184 disposed on the second laminate layer 162b. As shown in FIG. 3A, the resin layer 184 has a first side 188a and a second side 188b. The first side 188a of the resin layer 184 is adjacent the second side 170b of the second laminate layer 162b. The resin layer 184 can have a thickness in a range of from about 0.25 mil to about 5.0 mils, although other suitable thicknesses can be used.

The resin layer 184 can be disposed between the decorative layer 176 and the second laminate layer 162b. That is, the first side 188a of the resin layer 184 can be adjacent the second side 178b of the decorative layer 176 and the second side of the resin layer 184 can be adjacent the first side 170a of the second laminate layer 162b. Such a sequence of layers can be used with a second laminate layer 162b that comprises fiberglass, as described above.

The resin layer 184 can comprise an emboss resin layer, a prepreg resin layer, or another suitable resin material layer. The resin material of the resin layer 184 can be a texture retention material that forms to an introduced texture when processed, and that maintains that texture after curing. The emboss resin layer 184 can comprise one or more thermoset resin materials 186 consisting of epoxies, polyesters, phenols, polyurethanes, and/or a combination thereof. The thermoset resin material 186 can provide texture support, retention, and adhesion for the laminate layer(s) 162 adjacent the thermoset resin material 186 of the resin layer 184, and in particular, for polyvinyl fluoride (PVF) films. The emboss resin layer 184 can be a pigmented embossable resin, such as the thermoset resin material 186, which can be embossed to provide texture to the decorative laminate 110, and which can be colored to match the color or the predominant color of the image or design printed upon the first laminate layer 162a or another laminate layer 162.

The decorative laminate 110 can further comprise an optional adhesive layer 190 disposed between the decorative laminate 110 and a bonding surface 196 of the structural component 128, such as in the form of interior structural component 128a. As shown in FIG. 3A, the adhesive layer 190 comprises a first side 192a and a second side 192b. The first side 192a of the adhesive layer 190 is adjacent the second side 188b of the resin layer 184, and the second side 192b of the adhesive layer 190 is adjacent the bonding surface 196. The adhesive layer 190 can have a thickness in a range of from about 0.25 mil to about 5.0 mils, although other suitable thicknesses can be used.

The adhesive layer 190 can comprise a pressure sensitive adhesive 190a that can be applied or integrated with the decorative laminate 110. The pressure sensitive adhesive 190a can have a release liner 194 that may be removed and discarded when the decorative laminate 110 is applied to the structural component 128.

The adhesive layer 190 can comprise a spray glue, or other suitable spray or liquid adhesive material. The spray glue can be applied to the bonding surface 196 of the structural component 128, when the decorative laminate 110 is applied to the structural component 128.

The first laminate layer 162a, the decorative layer 176, and the second laminate layer 162b together comprise a top portion 198a or a top sheet. The top portion 198a, together with the resin layer 184, can form a decorative laminate 110 that is flexible and that can be easily formed around corners, contours, or curved portions of a structure, such as a structural component 128.

The first laminate layer 162a, the decorative layer 176, the second laminate layer 162b, and the resin layer 184 are sequentially layered and laminated together to form the decorative laminate 110 and are configured for application to the structural component 128. The structural component 128, such as interior structural component 128a, has the bonding surface 196.

When decorative laminate 110 is applied to structural component 128, first laminate layer 162a can be outermost. That is, people or substances that contact decorative laminate 110 can contact first surface 164a of first laminate layer 162a. Microorganisms transferred to the laminate may be killed, or their growth inhibited by the silver particles 181, or other anti-microbial agent, of first laminate layer 162a.

B. Illustrative Anti-Microbial Decorative Laminate

Figure 4A:
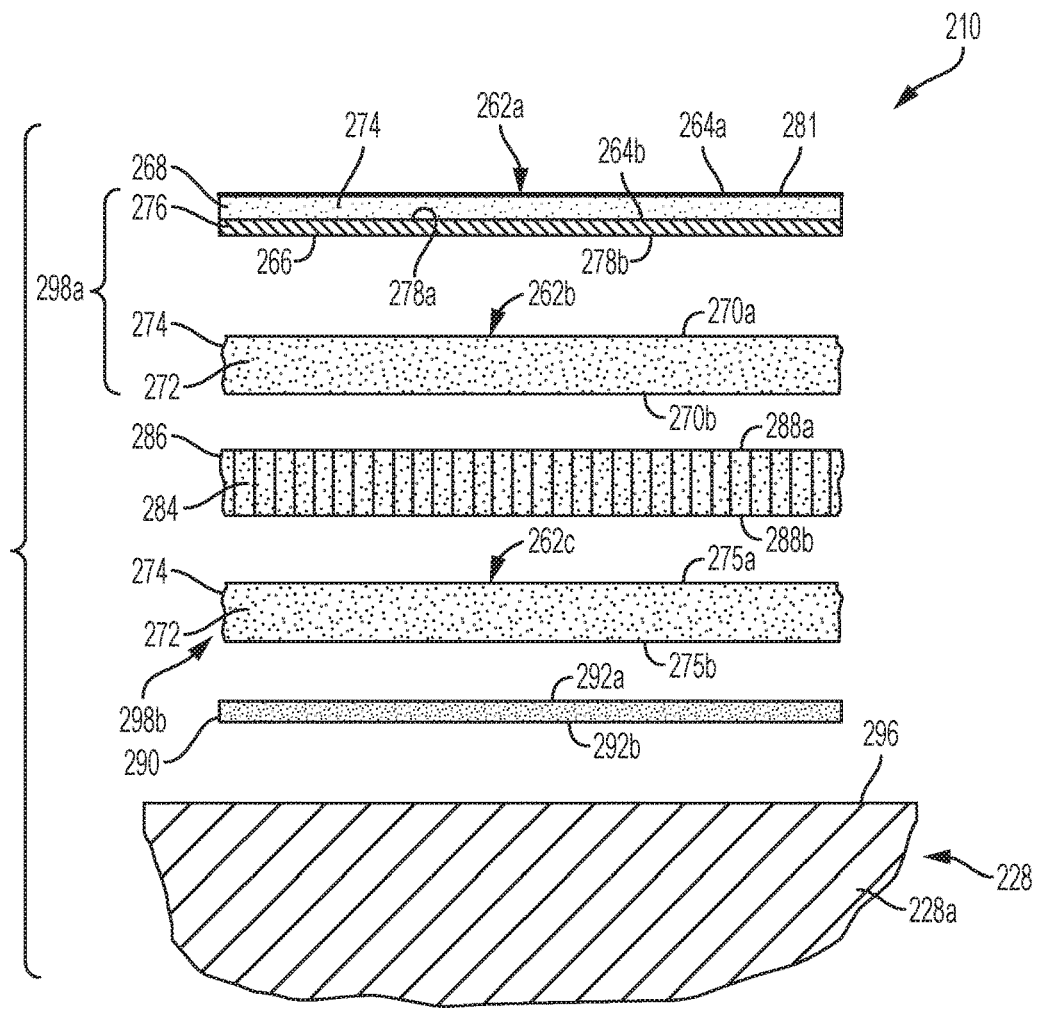
FIG. 4A is an exploded side view of another illustrative anti-microbial decorative laminate.
Figure 4B:
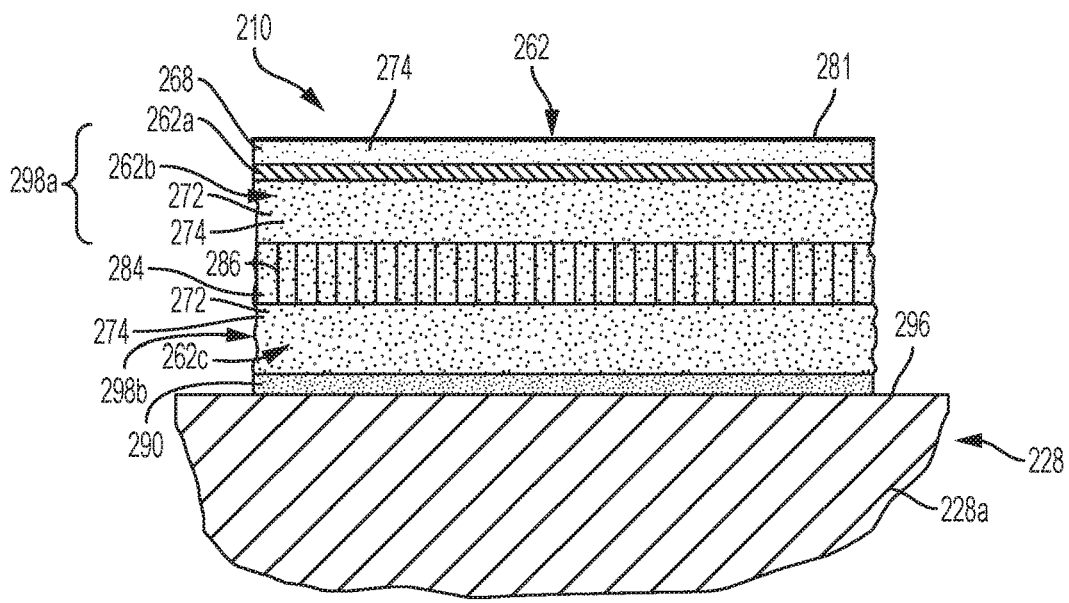
FIG. 4B is an assembled side view of the laminate of FIG. 4A.

As shown in FIGS. 4A-4B, this section describes an illustrative decorative laminate 210. Decorative laminate 210 is another example of anti-microbial decorative laminate 10, as described above. FIG. 4A is an exploded side view of decorative laminate 210, and FIG. 4B is an assembled side view of the decorative laminate. As shown, decorative laminate 210 includes a top portion 298a comprised of a first laminate layer 262a, a decorative layer 276, and a second laminate layer 262b. The decorative laminate 210 also includes a base portion 298b, or base layer, comprised of a third laminate layer 262c, and a resin layer 284 disposed between the second laminate layer 262b and the third laminate layer 262c. The presence of the base portion 298b can create a more rigid decorative laminate 210 that is beneficial for application to flat or substantially flat surfaces.

The first laminate layer 262a, the decorative layer 276, the second laminate layer 262b, the resin layer 284, and the third laminate layer 262c, are sequentially layered and laminated together to form the decorative laminate 210, and are configured for application to a structural component 228. The structural component 228 has a bonding surface 296.

As shown in FIG. 4A, the first laminate layer 262a has a first side 264a, a second side 264b, and a transparent appearance 268, or clear appearance, in that it will transmit light through it. The second laminate layer 262b has a first side 270a and a second side 270b.

As shown in FIG. 4A, the third laminate layer 262c comprises a first side 275a and a second side 275b. The first side 275a of the third laminate layer 262c is adjacent the second side 288b of the resin layer 284, and the second side 275b of the third laminate layer 262c is adjacent the first side 292a of the adhesive layer 290, when the adhesive layer 290 is included. The third laminate layer 262c, as well as the second laminate layer 262b may each have an opaque appearance 272 or unclear appearance, in that they will not transmit light through them.

In the present example, the first laminate layer 262a is comprised of a transparent a thermoplastic fluoropolymer material 274 such as a polyvinyl fluoride (PVF) film, with an anti-microbial coating 281 disposed on the thermoplastic fluoropolymer material 274. The anti-microbial coating 281 therefore comprises the first side 264a of the first laminate layer 262a. The anti-microbial coating 281 can include a phenolic compound such as para-tert-amylphenol (PTAP) and/or a solution thereof. The anti-microbial coating can also be transparent, and sufficiently heat and pressure resistant as to tolerate lamination without adverse effect.

The second laminate layer 262b and the third laminate layer 262c can each be comprised of a thermoplastic fluoropolymer material 274. As discussed above, the thermoplastic fluoropolymer material 274 can include a polyvinyl fluoride (PVF) film, a polyvinylidene fluoride (PVDF) film, an integral color polyvinyl fluoride (PVF) film, a polyvinyl fluoride (PVF) film/aluminum foil/adhesive material, or another suitable thermoplastic fluoropolymer material.

The decorative laminate 210 further comprises the decorative layer 276 disposed selectively between the first laminate layer 262a and the second laminate layer 262b. The decorative layer 276 comprises a first side 278a and a second side 278b, with the first side 278a of the decorative layer 276 adjacent the second side 264b of the first laminate layer 262a, and the second side 278b of the decorative layer 276 adjacent the first side 270a of the second laminate layer 262b.

The decorative layer 276 comprises one or more opaque or visible materials, disposed selectively between the first laminate layer 262a and the second laminate layer 262b. The decorative layer 276 can comprise one or more of an ink jet printed ink, a silk screen printed ink, a pigment-based ink, a dye-based ink, a paint, a stain, a digital printed ink, or another suitable material.

The decorative layer 276 can be deposited or applied between the first laminate layer 262a and the second laminate layer 262b. The decorative layer 276 can be printed on the second side 264b of the first laminate layer 262a to form the printed decorative material side 266. The decorative layer 276 can be deposited between the first laminate layer 262a and the second laminate layer 262b or printed onto the first laminate layer 262a via a printing process, as discussed above for decorative laminate 110.

The decorative laminate 210 further comprises a resin layer 284 disposed on the second laminate layer 262b. As further shown in FIG. 4A, the resin layer 284 has a first side 288a and a second side 288b. The first side 288a of the resin layer 284 is adjacent the second side 270b of the second laminate layer 262b, and the second side 288b of the resin layer 284 is adjacent the first side 275a of the third laminate layer 262c.

The resin layer 284 can comprise an emboss resin layer, a prepreg resin layer, or another suitable resin material layer. The emboss resin layer 284 can comprise one or more thermoset resin materials 286, as discussed for decorative laminate 110 above.

The decorative laminate 210 can further comprise an optional adhesive layer 290 disposed between the third laminate layer 262c and the bonding surface 296 of the structural component 228. As shown in FIG. 4A, the adhesive layer 290 has a first side 292a and a second side 292b. The first side 292a of the adhesive layer 290 is adjacent the second side 275b of the third laminate layer 262c, and the second side 292b of the adhesive layer 290 is adjacent the bonding surface 296. In the present example, the adhesive layer 290 comprises a spray glue layer 290b. However, other suitable spray or liquid adhesive materials may be used. Alternatively, the adhesive layer 290 can comprise a pressure sensitive adhesive 290a that may be applied or integrated with the decorative laminate 210.

Figure 5A:
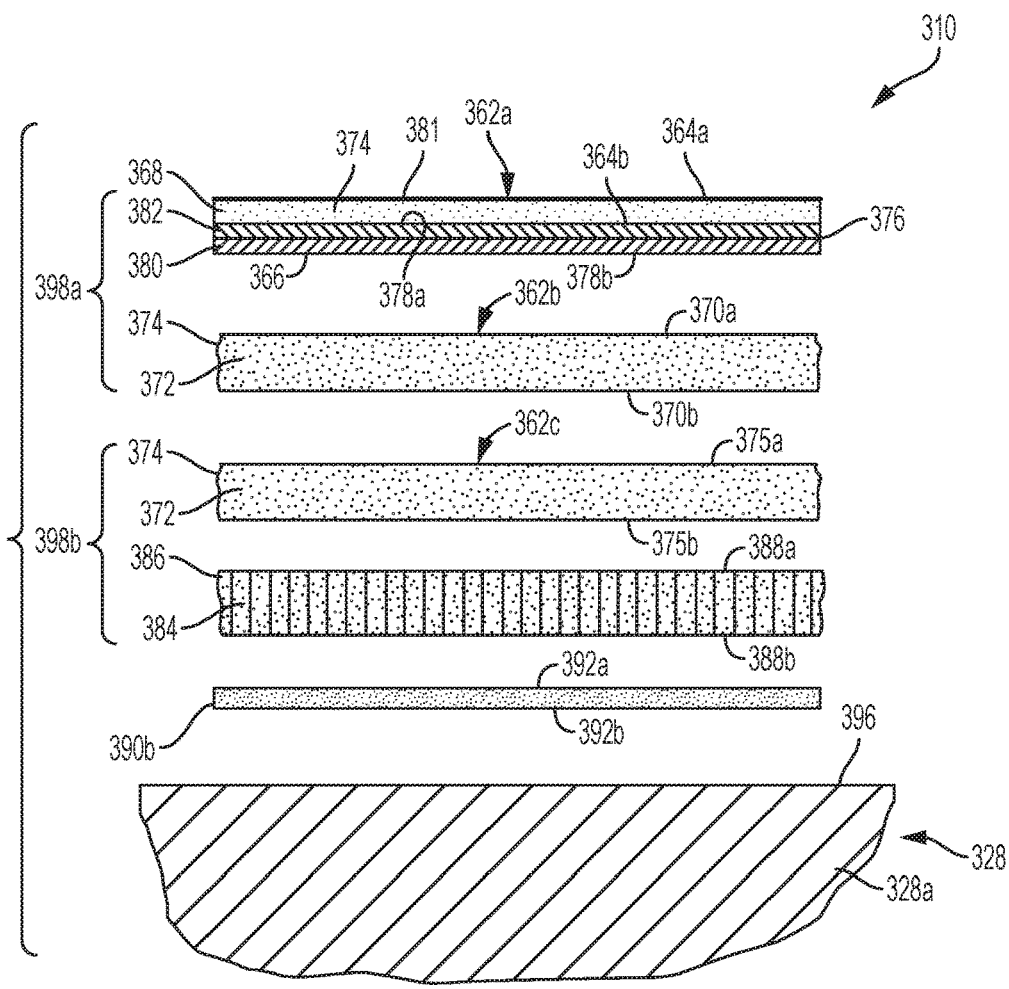
FIG. 5A is an exploded side view of another illustrative anti-microbial decorative laminate.
Figure 5B:
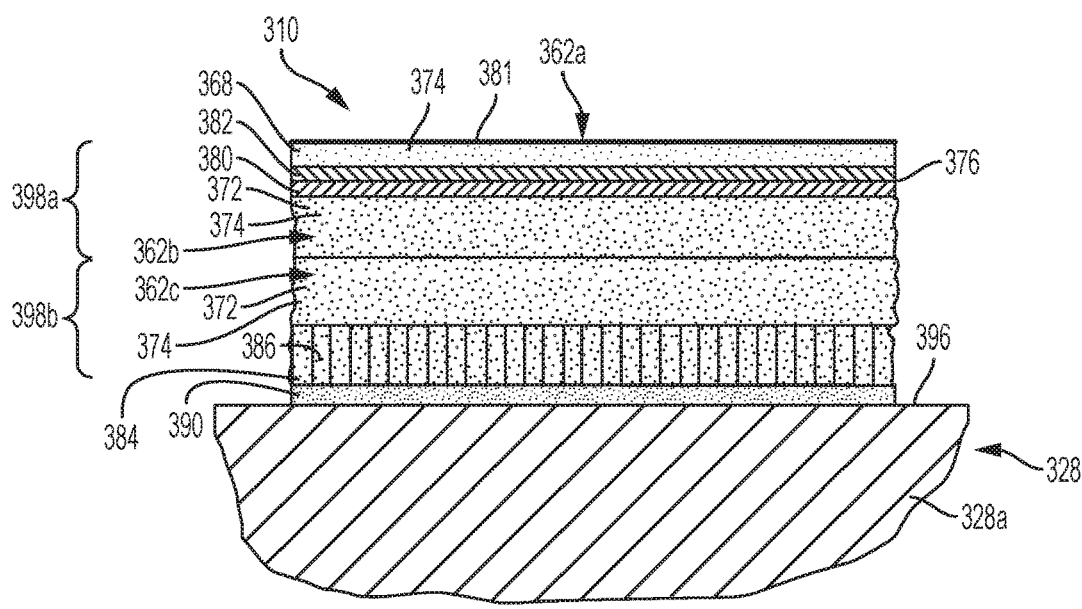
FIG. 5B is an assembled side view of the laminate of FIG. 5A.

C. Illustrative Anti-Microbial Decorative Laminate with Light Activated Materials As shown in FIGS. 5A-5B, this section describes an illustrative decorative laminate 310. Decorative laminate 310 is another example of anti-microbial decorative laminate 10, as described above. FIG. 5A is an exploded side view of decorative laminate 310, and FIG. 5B is an assembled side view of the decorative laminate. As shown, decorative laminate 310 includes a first laminate layer 362a, a decorative layer 376, a second laminate layer 362b, a third laminate layer 362c, and a resin layer 384.

The first laminate layer 362a, the decorative layer 376, the second laminate layer 362b, the third laminate layer 362c, and the resin layer 384 are sequentially layered and laminated together to form the decorative laminate 310, which is configured for application to a structural component 328. The structural component 328 has a bonding surface 396.

In this example, as shown in FIGS. 5A-5B, the third laminate layer 362c and the resin layer 384 of the decorative laminate 310c are in a reverse order, as compared to the decorative laminate 210 of FIGS. 4A-4B. As shown in FIGS. 5A-5B, the decorative laminate 310 includes a top portion 398a, or top sheet, comprised of the first laminate layer 362a, the decorative layer 376, and the second laminate layer 362b, and includes a base portion 398b, or base layer, comprised of the third laminate layer 362c and the resin layer 384.

As further shown in FIGS. 5A-5B, the decorative laminate 310 has the third laminate layer 362c disposed between the second laminate layer 362b and the resin layer 384. Again, as with the decorative laminate 210 in FIGS. 4A-4B, the presence of the base portion 398b can create a more rigid decorative laminate 310 that is beneficial for application to flat or substantially flat surfaces.

As shown in FIG. 5A, the second laminate layer 362b has a first side 370a and a second side 370b. The third laminate layer 362c includes a first side 375a and a second side 375b. The first side 375a of the third laminate layer 362c is adjacent the second side 370b of the second laminate layer 362b, and the second side 375b of the third laminate layer 362c is adjacent the first side 388a of the resin layer 384.

The third laminate layer 362c, as well as the second laminate layer 362b can each have the opaque appearance 372 or unclear appearance, in that they will not transmit light through them. Similarly to the decorative laminate 210 of FIGS. 4A-4B discussed above, the second laminate layer 362b and the third laminate layer 362c can each be comprised of a thermoplastic fluoropolymer material 374.

The second laminate layer 362b or the third laminate layer 362c can include a foil, such as aluminum foil, adhered to the thermoplastic fluoropolymer material. For instance, the second laminate layer 362b can include a layer of foil that is bonded to a thermoplastic fluoropolymer film, and forms the second side 370b of the second laminate layer 362b. The foil can therefore contact the first side 375a of the third laminate layer 362c.

As further shown in FIG. 5A, the first laminate layer 362a has a first side 364a, a second side 364b, and a transparent appearance, or clear appearance, in that it will transmit light through it. In the present example, the first laminate layer 362a is comprised of a transparent a thermoplastic fluoropolymer material 374 such as a polyvinyl fluoride (PVF) film, with an anti-microbial coating 381 on the first side 364a. The anti-microbial coating 381 can include a finely powdered metal such as silver, zinc, or copper mixed with a transparent or non-visible ink material. The ink material and powdered metal can be printed on the first side 364a of the first laminate layer 362a to form a printed anti-microbial side. The ink material and powdered metal can be printed uniformly over first side 364a and/or can be printed in a pattern such as a grid. The printing process can comprise an ink jet printing process, a silkscreen printing process, a digital printing process, or another suitable printing process.

The decorative laminate 310 further comprises the decorative layer 376 disposed selectively between the first laminate layer 362a and the second laminate layer 362b. As shown in FIGS. 5A-5B, the decorative layer 376 includes a first side 378a and a second side 378b, with the first side 378a of the decorative layer 376 adjacent the second side 364b of the first laminate layer 362a, and the second side 378b of the decorative layer 376 adjacent the first side 370a of the second laminate layer 362b.

The decorative layer 376 comprises one or more visible materials 380 disposed selectively between the first laminate layer 362a and the second laminate layer 362b. The one or more visible materials 380 can comprise one or more of a visible ink jet printed ink, a visible silk screen printed ink, a visible pigment-based ink, a visible dye-based ink, a visible paint, a visible stain, a visible digital printed ink, or another suitable visible material.

The decorative layer further comprises one or more non-visible light activated materials 382 disposed selectively between the first laminate layer 362a and the second laminate layer 362b. The one or more non-visible light activated materials 382 can change from a non-visible state to a visible state when exposed to a light source 412. The light source 412 can be an ultraviolet (UV) light source, an infrared (IR) light source, a light-emitting diode (LED) light source, or another suitable light source.

The one or more non-visible light activated materials 382 can comprise one or more of a non-visible ink jet printed ink, a non-visible silk screen printed ink, a non-visible pigment-based ink, a non-visible paint, a non-visible stain, a non-visible digital printed ink, or another suitable non-visible light activated material, each configured to change from the non-visible state to the visible state, when exposed to the light source 412. For example, the non-visible light activated materials 382 can comprise light activated or light sensitive materials, such as ultraviolet light sensitive non-visible or invisible inks. Ultraviolet light sensitive non-visible or invisible inks are a class of inks which are non-visible or invisible to the naked eye, but become highly visible under ultraviolet light.

The decorative layer 376 may be deposited or applied between the first laminate layer 362a and the second laminate layer 362b. The decorative layer 376 can be printed on the second side 164b of the first laminate layer 162a to form a printed decorative material side 366. The decorative layer 376 can be deposited between the first laminate layer 362a and the second laminate layer 362b or printed onto the first laminate layer 362a via a printing process. The printing process can comprise an ink jet printing process, a silkscreen printing process, a digital printing process, or another suitable printing process.

The decorative laminate 310 further comprises the resin layer 384 disposed on the third laminate layer 362c. As further shown in FIG. 5A, the resin layer 384 has a first side 388a and a second side 388b. The first side 388a of the resin layer 384 is adjacent the second side 375b of the third laminate layer 362c, and the second side 388b of the resin layer 384 is adjacent the first side 392a of the adhesive layer 390. The resin layer 384 comprises a prepreg resin layer.

The decorative laminate 310 can further comprise the optional adhesive layer 390 disposed between resin layer 384 and the bonding surface 396 of the structural component 328. As shown in FIG. 5A, the adhesive layer 390 includes a first side 392a and a second side 392b. The first side 392a of the adhesive layer 390 is adjacent the second side 388b of the resin layer 384, and the second side 392b of the adhesive layer 390 is adjacent the bonding surface 396. In the present example, the adhesive layer 390 comprises a spray glue layer. However, other suitable spray or liquid adhesive materials can be used. Alternatively, the adhesive layer 390 can comprise a pressure sensitive adhesive 390a that can be applied or integrated with the decorative laminate 310.

D. Anti-microbial Structural Components and Composite Panels

Figure 6:
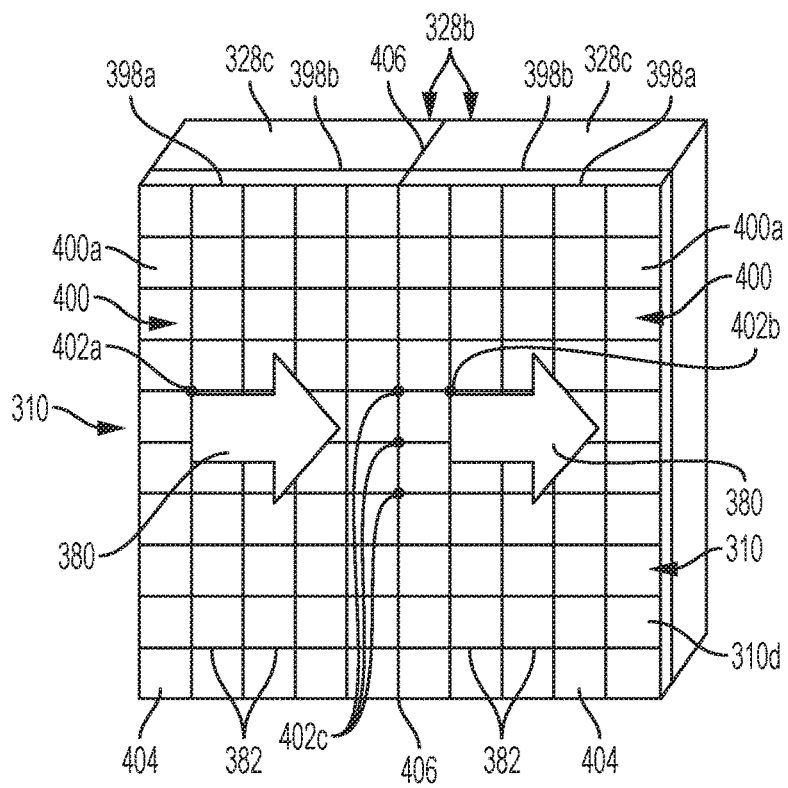
FIG. 6 is a front perspective view of assembled structural composite panels, each including an applied anti-microbial decorative laminate with a positional system pattern.

FIG. 6 is an illustration of a front perspective view of assembled structural composite panels 328b, such as cured structural composite panels, each with anti-microbial decorative laminate 310 as described above, having a positional system pattern 400. Each decorative laminate 310 has a top portion 398a and a base portion 398b.

Each decorative laminate 310 include the visible material 380, e.g., in the form of arrow images, and comprises the non-visible light activated material 382 in the form of the positional system pattern 400. The non-visible light activated material 382 forms the positional system pattern 400 such as an alignment pattern 400a on a decorative area 404 of each decorative laminate 310. The non-visible light activated material 382 can be deposited or printed on the decorative laminate 310 in the alignment pattern 400a to facilitate alignment and positioning of the decorative laminate 310, when applied to a structural component 328. Furthermore, each decorative laminate 310 includes anti-microbial agent in anti-microbial coating 381, as described previously.

Non-decorative information or markings, such as manufacturing positional targets 402a, 402b, comprised of non-visible light activated material 382 can be included on the positional system pattern of each decorative laminate 310. When illuminated with a light source, such as an ultraviolet (UV) light source, an infrared (IR) light source, or another suitable light source, the manufacturing positional targets 402a, 402b can provide manufacturers, manufacturing-related users, or other users, with visible target reference points for positioning and aligning the decorative laminate 310 on the structural composite panel 328b. In addition, the manufacturing positional targets 402a, 402b remain intact and do not get trimmed off of the final manufactured version of the decorative laminate 310 applied on a structural composite panel 328b.

Non-decorative information or markings, such as assembly positional targets 402c, comprised of non-visible light activated material 382 can be included on the positional system pattern of each decorative laminate 310. The assembly positional targets 402c along an alignment seam 406 are formed between the two decorative laminates 310 of the two respective structural composite panels 328b to facilitate alignment and positioning of the decorative laminates 310 and the structural composite panels 328b with one another.

When illuminated with the light source, such as an ultraviolet (UV) light source, an infrared (IR) light source, or another suitable light source, the assembly positional targets 402c can provide assemblers, assembly-related users, or other users, with visible target reference points for aligning the decorative laminates 310 on each structural composite panel 328b with one another. In addition, the assembly positional targets 402c remain intact and do not get trimmed off of the final manufactured or assembled version of the decorative laminate 310 applied on the structural composite panels 328b.

In addition to the manufacturing positional targets 402a, 402b and the assembly positional targets 402c, the non-visible light activated material 382 can be deposited or printed on the decorative laminate 310 in the form of other non-decorative information or markings, such as part numbers, bar codes, repair instructions, or other non-decorative information, to locate and identify structural components for inspection, repair, removal, maintenance, or other procedure.

Figure 7A:
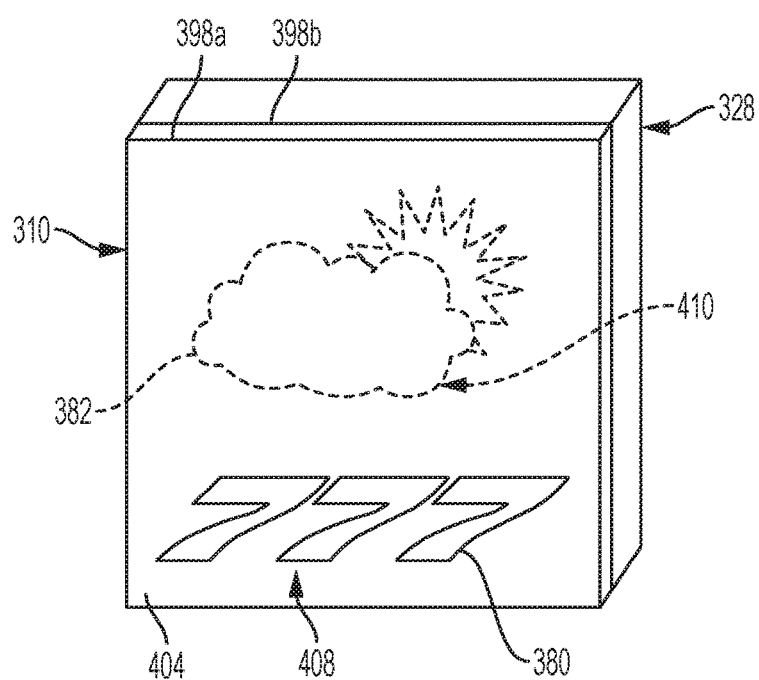
FIG. 7A is a front perspective view of an aircraft interior structural component with applied anti-microbial decorative laminate with first and second decorative themes.
Figure 7B:
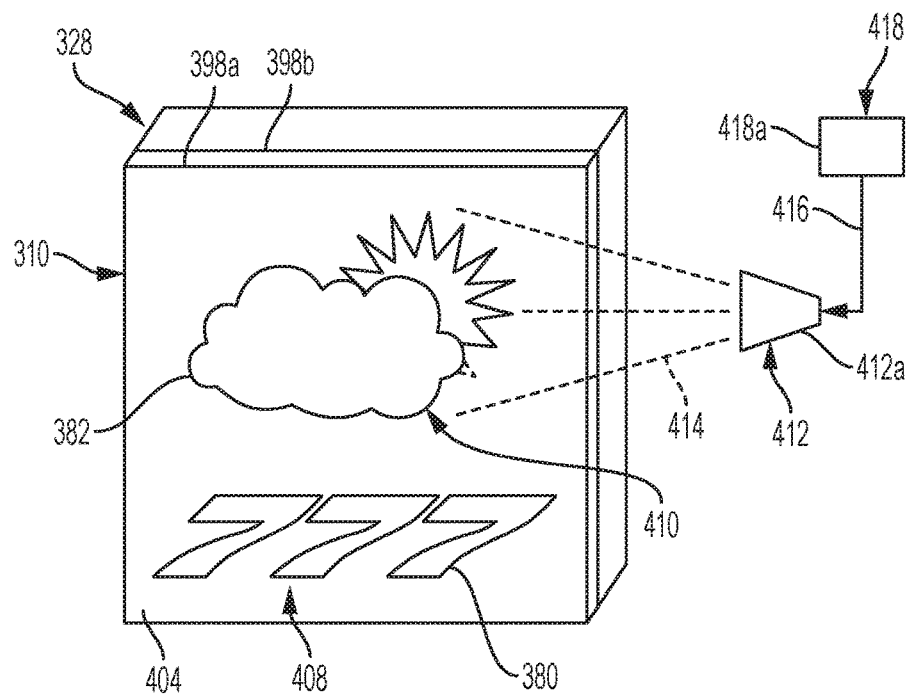
FIG. 7B is a front perspective view of the structural component of FIG. 7A, exposed to a light source.

Referring now to FIGS. 7A-7B, FIG. 7A shows a front perspective view of a structural component 328 with decorative laminate 310 showing a first theme 408, e.g., the number "777", such as an image or design, that is visible and showing a second theme 410, e.g., sun and cloud, such as an image or design, that is non-visible. FIG. 7B is an illustration of a front perspective view of the structural component 328 of FIG. 7A, with decorative laminate 310 showing the first theme 408, e.g., the number "777", that is visible, and showing the second theme 410, e.g., sun and cloud, that is visible when exposed to and illuminated by a lighting source 412.

Decorative laminate 310 has a top portion 398a, a base portion 398b, and a decorative area 404. The visible material 380 forms the first theme 408, e.g., the number "777", and the non-visible light activated material 382 forms the second theme 410, e.g., sun and cloud. The second theme 410 can be separate and distinct from the first theme 408. Alternatively, the second theme 410 can augment the first theme 408, that is, the second theme 410 can be part of, connected to, or highlight the first theme 408 in some manner. The top portion of laminate 310 can include anti-microbial coating 381 as described above, and/or any anti-microbial agent, for example dispersed in the top portion or applied as a layer.

Figure 9:
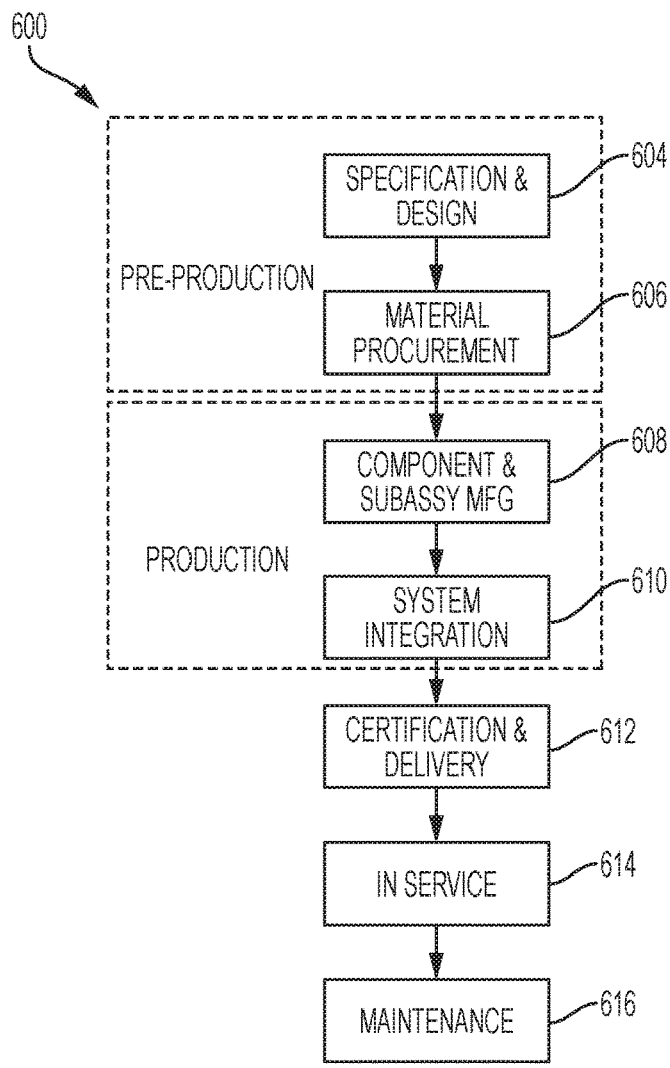
FIG. 9 is a flowchart depicting steps of an illustrative aircraft manufacturing and service method.

In FIG. 7A, the first theme 408 comprised of visible material 380 is visible, and the second theme 410 comprised of non-visible light activated material 382 is non-visible and in a non-visible state or condition. In FIG. 7B, the first theme 408 comprised of visible material 380 is visible, and the second theme 410 comprised of non-visible light activated material 382 is now visible via illumination 414 from and exposure to the light source 412, such as in the form of ultraviolet (UV) light source 412a. In FIG. 7B, the second theme 410 has changed from the non-visible state to the visible state (FIG. 9B) with exposure to the light source 412.

As further shown in FIG. 7B, a lighting system 418 such as an aircraft lighting system, is coupled to or connected to the light source 412 via a connection element 416, such as a wired or wireless connection. The light source 412, such as ultraviolet (UV) light source 412a is configured to illuminate and change the non-visible light activated material 382 from the non-visible state to the visible state. The light source 412 can also comprise an infrared (IR) light source, a light-emitting diode (LED) light source, or another suitable light source.

E. Illustrative Method of Making Anti-Microbial Decorative Laminate

Figure 8:
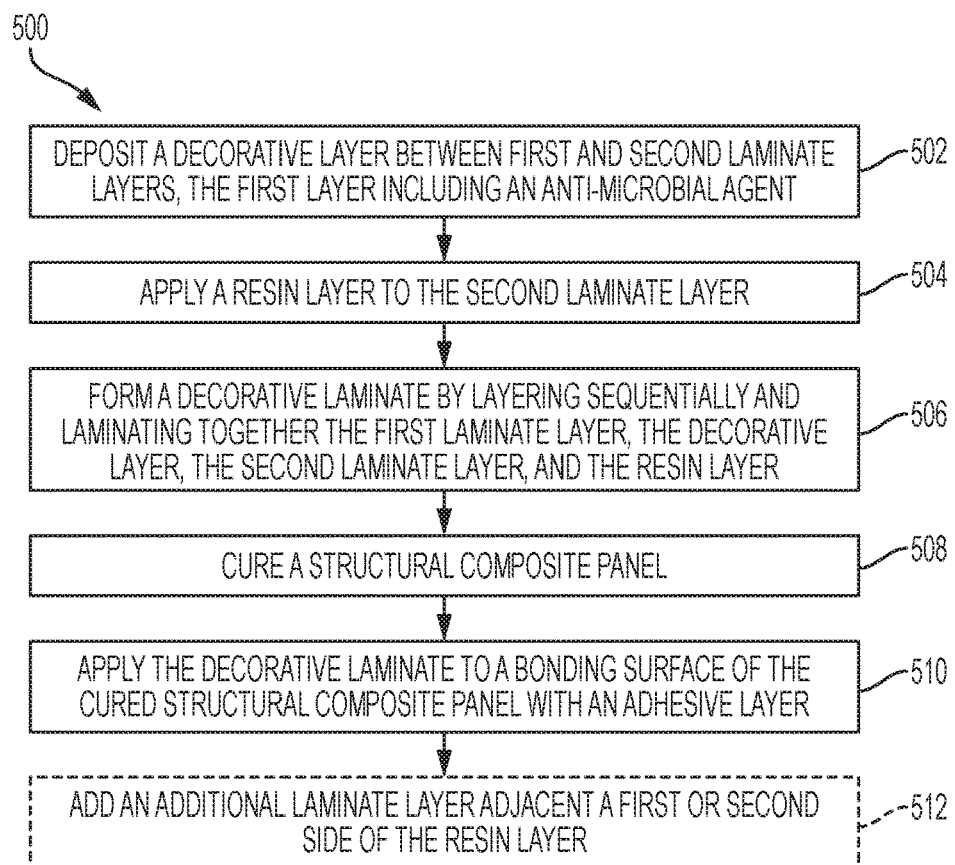
FIG. 8 is a flow chart depicting steps of an illustrative method for making anti-microbial decorative laminate according to the present teachings.

This section describes steps of an illustrative method for making anti-microbial decorative laminate; see FIG. 8. Aspects of decorative laminates, laminate layers, and/or decorative layers described above can be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method. Although various steps of method 500 are described below and depicted in FIG. 8, the steps need not necessarily all be performed, and in some cases may be performed simultaneously, or in a different order than the order shown. Based on the present disclosure, it should be understood that additional steps may be performed, without departing from the present claims.

At step 502, the method includes depositing a decorative layer between a first laminate layer and a second laminate layer. The first and second laminate layers can each include a thermoplastic fluoropolymer material. The first laminate layer can be clear or transparent, and can further include an anti-microbial agent.

Incorporating the anti-microbial agent in the first laminate layer prior to manufacture of the decorative laminate can simplify production of the decorative laminate, allowing use of well-tested procedures and existing equipment. Alternatively, the anti-microbial agent can be incorporated into the first laminate layer after manufacture of the decorative laminate. This order of method steps may be appropriate to temperature or pressure-sensitive anti-microbial agents that might undergo unwanted chemical or physical changes during lamination.

The anti-microbial agent can include any effective chemical agents, biological agents, and/or any combination of agents, including but not limited to bacteriostatic agents, fungistatic agents, antibiotic agents, and fungicides. For example, the anti-microbial agent can be a metal such as silver, copper, zirconium, sodium, potassium, and/or any combination thereof. For another example, the anti-microbial agent can be a phenolic such as para-tert-amylphenol (PTAP).

The anti-microbial agent and thermoplastic fluoropolymer material of the first laminate layer can be incorporated, adhered, aggregated, or otherwise combined in any effective manner. The anti-microbial agent can be homogenously distributed throughout the thermoplastic fluoropolymer material, can be localized proximate one side of the first laminate layer, and/or can be disposed according to some pattern. The anti-microbial agent and the polymer material can be combined in such a manner as to achieve a desired transparency of first laminate layer.

The decorative layer can include one or more visible materials. The decorative layer can further include one or more non-visible light activated materials that change from a non-visible state to a visible state when exposed to a light source. The light source can be an ultraviolet (UV) light source, an infrared (IR) light source, or another suitable light source.

Step 502 can include depositing the decorative layer via a printing process. The printing process can include an ink jet printing process, a silkscreen printing process, a digital printing process, or another suitable printing process. Step 502 can further include depositing one or more of the non-visible light activated materials in an alignment pattern to facilitate alignment of the completed laminate, when applied to a cured structural composite panel.

The method 500 then includes step 504 of applying a resin layer to the second laminate layer. The method 500 further includes step 506 of forming a decorative laminate by layering sequentially and laminating together at a specified heat and a specified pressure the first laminate layer, the decorative layer, the second laminate layer, and the resin layer.

Step 506 can include using a press forming process to heat and cure the first laminate layer, the decorative layer, the second laminate layer, and the resin layer at a specified heat, such as an effective elevated temperature, and at a specified pressure, such as an effective pressure, for an effective period of time to form the decorative laminate. The first laminate layer, the decorative layer, the second laminate layer, and the resin layer can be layered and laid up on a flat configuration, such as a flat metal caul plate or the like, in large sheets, e.g., 5 feet by 8 feet. The large sheets can be heated and cured in a multiple opening press, such as with flat platens, used in the press forming process.

The effective elevated temperature for heating and curing the decorative laminate can be in a range of from about 200 F (two hundred degrees Fahrenheit) to about 400 F (four hundred degrees Fahrenheit), or more. The effective period of time for heating and curing the decorative laminate can be in a range of from about 10 (ten) minutes to about 120 (one hundred twenty) minutes, or more. The effective pressure for heating and curing the decorative laminate can be at a pressure, for example, in a range of from about 50 psi (fifty pounds per square inch) to about 200 psi (two hundred pounds per square inch). The temperature, pressure, and time selected for the heating and curing can be selected based on the type of resin layer used in the forming the decorative laminate, for example, a thermoset resin or a thermoplastic resin, or the type of thermoset resin or type of thermoplastic resin used.

The large sheets of the laid up first laminate layer, decorative layer, second laminate layer, and resin layer can be heated and cured in a multiple opening press at a pressure in a range of from about 50 psi (fifty pounds per square inch) to about 200 psi (two hundred pounds per square inch), at a temperature in a range of from about 200 F (two hundred degrees Fahrenheit) to about 400 F (four hundred degrees Fahrenheit), and at a time in a range of from about 10 (ten) minutes to about 120 (one hundred twenty) minutes. For example, the thermal cycle can have a duration of approximately 60 (sixty) minutes including ramp up and ramp down times, and can maintain a maximum temperature for as much as 20 (twenty) minutes. The decorative laminate can be cooled in the multiple opening press to ambient temperature for a sufficient time period and then removed for application to a structural component, such as an aircraft interior structural component. The decorative laminate can also be formed with other known press forming processes.

Step 508 of the method includes curing a structural composite panel. Step 510 includes applying the decorative laminate to a bonding surface of the cured structural composite panel with an adhesive layer. The adhesive layer can comprise a pressure sensitive adhesive with a release liner, a spray glue, or another suitable adhesive material. The cured structural composite panel may form part of structural component. The structural component may be an interior structural component of an aircraft, rotorcraft, spacecraft, watercraft, automobile, truck, and/or other vehicle. Step 510 can further include applying the decorative laminate to one or more of a flat surface, a curved surface, a contoured surface, or another suitable surface, of the structural component.

Method 500 further includes the optional step 512 of adding an additional laminate layer adjacent either a first side or a second side of the resin layer. Step 512 can be repeated as appropriate, to add one or more additional laminate layers. Additionally, optional flame retardant material or other laminate materials can be added to the decorative laminate. Further, the decorative laminate can be applied to the structural component 128 using known processes such as thermoforming, vacuum forming, or another suitable known application processes.

F. Illustrative Aircraft and Associated Method

Figure 10:
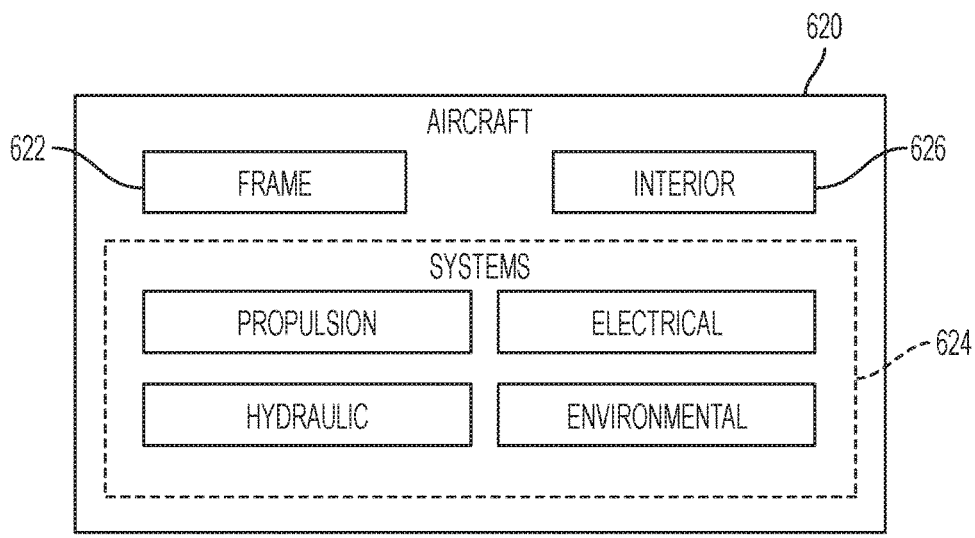
FIG. 10 is a schematic diagram of an illustrative aircraft.

Examples disclosed herein can be described in the context of an illustrative aircraft manufacturing and service method 600 (see FIG. 9) and an illustrative aircraft 620 (see FIG. 10). Method 600 includes a plurality of processes, stages, or phases. During pre-production, method 600 can include a specification and design phase 604 of aircraft 620 and a material procurement phase 606. During production, a component and subassembly manufacturing phase 608 and a system integration phase 610 of aircraft 620 can take place. Thereafter, aircraft 620 can go through a certification and delivery phase 612 to be placed into in-service phase 614. While in service (e.g., by an operator), aircraft 620 can be scheduled for routine maintenance and service 616 (which may also include modification, reconfiguration, refurbishment, and so on of one or more systems of aircraft 620). While the examples described herein relate generally to production during component and subassembly manufacturing phase 608 of aircraft 620, they can be practiced at other stages of method 600.

Each of the processes of method 600 can be performed or carried out by a system integrator, a third party, and/or an operator (e.g., a customer). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

As shown in FIG. 10, aircraft 620 produced by illustrative method 600 can include a frame 622 with a plurality of systems 624 and an interior 626. Although an aerospace example is shown, the principles disclosed herein can be applied to other industries, such as the automotive industry, rail transport industry, and nautical engineering industry. Accordingly, in addition to aircraft 620, the principles disclosed herein can apply to other vehicles, e.g., land vehicles, marine vehicles, etc. In any of these cases, interior 626 can include decorative laminates that incorporate antimicrobial agents according to the teachings of the present disclosure.

Apparatuses and methods shown or described herein can be employed during any one or more of the stages of the manufacturing and service method 600. For example, components or subassemblies corresponding to component and subassembly manufacturing phase 608 can be fabricated or manufactured in a manner similar to components or subassemblies produced while aircraft 620 is operating during in-service phase 614. Also, one or more examples of the apparatuses, methods, or combinations thereof can be utilized during production stages 608 and 610, for example, by substantially expediting assembly of or reducing the cost of aircraft 620. Similarly, one or more examples of the apparatus or method realizations, or a combination thereof, can be utilized, for example and without limitation, while aircraft 620 is in production and/or during maintenance and service phase 616.

G. Illustrative Combinations and Additional Examples

This section describes additional aspects and features of anti-microbial decorative laminates and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference, in any suitable manner. Some of the paragraphs below expressly refer to and further limit other paragraphs, providing without limitation examples of some of the suitable combinations.

A0. A decorative laminate comprising:
a first laminate layer containing an anti-microbial agent;
a second laminate layer;
a decorative layer disposed selectively between the first laminate layer and the second laminate layer, the decorative layer comprising:
one or more visible materials; and
one or more non-visible light activated materials that change from a non-visible state to a visible state, when exposed to a light source, the light source comprising an ultraviolet (UV) light source or an infrared (IR) light source; and
a resin layer disposed on the second laminate layer,
wherein the first laminate layer and the second laminate layer each comprise a thermoplastic fluoropolymer material, and
wherein the first laminate layer, the decorative layer, the second laminate layer, and the resin layer are laminated together to form the decorative laminate configured for application to a structural component.

A1. The decorative laminate of A0, further comprising an adhesive layer disposed between the decorative laminate and a bonding surface of the structural component.

A2. The decorative laminate of any of A0-A1, further comprising one or more additional laminate layers adjacent a first side of the resin layer.

A3. The decorative laminate of any of A0-A2, further comprising one or more additional laminate layers adjacent a second side of the resin layer.

A4. The decorative laminate of any of A0-A3, wherein the one or more non-visible light activated materials are deposited in an alignment pattern that facilitate alignment of the decorative laminate when applied to the structural component.

A5. The decorative laminate of any of A0-A4, wherein the one or more visible materials comprise one or more of a visible ink jet printed ink, a visible silk screen printed ink, a visible pigment-based ink, a visible dye-based ink, a visible paint, a visible stain, and a visible digital printed ink.

A6. The decorative laminate of any of A0-A5, wherein the one or more non-visible light activated materials comprise one or more of a non-visible ink jet printed ink, a non-visible silk screen printed ink, a non-visible pigment-based ink, a non-visible dye-based ink, a non-visible paint, a non-visible stain, and a non-visible digital printed ink, each configured to change from the non-visible state to the visible state when exposed to the light source.

A7. The decorative laminate of any of A0-A6, wherein the anti-microbial agent is finely powdered silver dispersed within the first laminate layer.

A8. The decorative laminate of any of A0-A7, wherein the anti-microbial agent is selected from the group consisting of silver, copper, zirconium, sodium, potassium and para-tert-amylphenol (PTAP).

A9. The decorative laminate of any of A0-A8, wherein the resin layer comprises an emboss resin layer or a prepreg resin layer, the emboss resin layer comprising one or more thermoset resin materials selected from the group consisting of epoxies, polyesters, phenols, polyurethanes, and a combination thereof.

A10. The decorative laminate of any of A0-A9, wherein the structural component comprises an interior structural component, a structural composite panel, an aircraft interior structural component, a rotorcraft interior structural component, a spacecraft interior structural component, a watercraft interior structural component, an automobile interior structural component, or a truck interior structural component.

B0. A decorative laminate system comprising:
a structural component having a bonding surface;
a decorative laminate applied to the bonding surface of the structural component, the decorative laminate comprising:
a first laminate layer having a transparent appearance and containing an anti-microbial agent;
a second laminate layer having an opaque appearance, the first laminate layer and the second laminate layer each comprising a thermoplastic fluoropolymer material selected from the group consisting of polyvinyl fluoride (PVF) film, polyvinylidene fluoride (PVDF) film, integral color polyvinyl fluoride (PVF) film, and polyvinyl fluoride (PVF) film/aluminum foil/adhesive material;
a decorative layer disposed between the first laminate layer and the second laminate layer, the decorative layer comprising:
one or more visible materials; and
one or more non-visible light activated materials;
a resin layer disposed on the second laminate layer;
an adhesive layer disposed between the decorative laminate and the bonding surface of the structural component; and
a lighting system having a light source configured to illuminate and change the one or more non-visible light activated materials from a non-visible state to a visible state, the light source comprising an ultraviolet (UV) light source or an infrared (IR) light source.

B1. The decorative laminate system of B0, wherein the decorative laminate further comprises one or more additional laminate layers adjacent either a first side of the resin layer, or a second side of the resin layer.

B2. The decorative laminate system of any of B0-B1, wherein the one or more visible materials comprise one or more of a visible ink jet printed ink, a visible silk screen printed ink, a visible pigment-based ink, a visible dye-based ink, a visible paint, a visible stain, and a visible digital printed ink.

B3. The decorative laminate system of any of B0-B2, wherein the one or more non-visible light activated materials comprise one or more of a non-visible ink jet printed ink, a non-visible silk screen printed ink, a non-visible pigment-based ink, a non-visible dye-based ink, a non-visible paint, a non-visible stain, and a non-visible digital printed ink, each configured to change from the non-visible state to the visible state when exposed to the light source.

B4. The decorative laminate system of any of B0-B3, wherein the anti-microbial agent is either a finely powdered metal selected from the group consisting of silver, copper, zirconium, sodium and potassium, or a phenolic.

C0. A method of making a composite panel having a decorative laminate applied thereto, the method comprising the steps of:
  depositing a decorative layer between a first laminate layer and a second laminate layer, wherein the first laminate layer and the second laminate layer each comprise a thermoplastic fluoropolymer material and wherein the first laminate layer further comprises an anti-microbial agent, the decorative layer comprising:
    one or more visible materials; and
    one or more non-visible light activated materials that change from a non-visible state to a visible state, when exposed to a light source, the light source comprising an ultraviolet (UV) light source or an infrared (IR) light source;
  applying a resin layer to the second laminate layer;
  forming a decorative laminate by layering sequentially and laminating together at a specified heat and a specified pressure the first laminate layer, the decorative layer, the second laminate layer, and the resin layer;
  curing a structural composite panel to form a cured structural composite panel; and
  applying with an adhesive layer the decorative laminate to a bonding surface of the cured structural composite panel to form the composite panel having the decorative laminate applied thereto.

C1. The method of C0, wherein the anti-microbial agent is either a powdered metal or a phenolic.

C2. The method of any of C0-C1, wherein the step of depositing the decorative layer between the first laminate layer and the second laminate layer further comprises depositing the decorative layer via an ink jet printing process, a silkscreen printing process, or a digital printing process.

C3. The method of any of C0-C2, wherein the step of depositing the decorative layer between the first laminate layer and the second laminate layer further comprises depositing the one or more of the non-visible light activated materials in an alignment pattern to facilitate alignment of the decorative laminate, when applied to the cured structural composite panel.

D0. A decorative laminate comprising:
  a first laminate layer containing an anti-microbial agent;
  a second laminate layer; and
  a decorative layer disposed selectively between the first laminate layer and the second laminate layer;
  wherein the first laminate layer and the second laminate layer each comprise a thermoplastic fluoropolymer material, and
  wherein the first laminate layer, the decorative layer, and the second laminate layer are laminated together to form the decorative laminate configured for application to a structural component.

D1. The decorative laminate of D0, further comprising an adhesive layer disposed between the decorative laminate and a bonding surface of the structural component.

D2. The decorative laminate of any of D0-D1, further comprising one or more additional laminate layers adjacent a first side of the decorative laminate layer.

D3. The decorative laminate of any of D0-D2, further comprising one or more additional laminate layers adjacent a second side of the decorative laminate layer.

D4. The decorative laminate of any of D0-D3, wherein the decorative laminate layer includes one or more materials deposited in an alignment pattern that facilitates alignment of the decorative laminate when applied to the structural component.

D5. The decorative laminate of any of D0-D4, wherein the decorative laminate includes one or more of an ink jet printed ink, a silk screen printed ink, a pigment-based ink, a dye-based ink, a paint, a stain, and a digital printed ink.

D6. The decorative laminate of any of D0-D5, wherein the anti-microbial agent is powdered silver dispersed within the first laminate layer.

D7. The decorative laminate of any of D0-D6, wherein the anti-microbial agent includes at least one of a bacteriostatic agent, a fungistatic agent, an antibiotic agent, a fungicide, or a combination thereof.

D8. The decorative laminate of any of D0-D7, wherein the decorative layer includes a resin layer disposed on the second laminate, and wherein the resin layer includes one or more thermoset resin materials.

D9. The decorative laminate of any of D0-D8, wherein the structural component comprises a building interior structural component, a building structural composite panel, an aircraft interior structural component, a rotorcraft interior structural component, a spacecraft interior structural component, a watercraft interior structural component, an automobile interior structural component, or a truck interior structural component.

E0. A decorative laminate system comprising:
  a structural component having a bonding surface;
  a decorative laminate applied to the bonding surface of the structural component, the decorative laminate comprising:
    a first laminate layer having a transparent appearance and containing an anti-microbial agent;
    a second laminate layer having an opaque appearance, the first laminate layer and the second laminate layer each comprising a thermoplastic fluoropolymer material;
    a decorative layer disposed between the first laminate layer and the second laminate layer;
    a resin layer disposed on the second laminate layer; and
    an adhesive layer disposed between the decorative laminate and the bonding surface of the structural component.

E1. The decorative laminate system of E0, wherein the decorative laminate further comprises one or more additional laminate layers adjacent either a first side of the resin layer or a second side of the resin layer.

E2. The decorative laminate system of any of E0-E1, wherein the decorative layer includes one or more of an ink jet printed ink, a silk screen printed ink, a pigment-based ink, a dye-based ink, a paint, a stain, and a digital printed ink.

E3. The decorative laminate system of any of E0-E2, wherein the anti-microbial agent is either a powdered metal or a phenolic.

E4. The decorative laminate system of any of E0-E3, wherein the anti-microbial agent includes at least one of a bacteriostatic agent, a fungistatic agent, an antibiotic agent, a fungicide, or a combination thereof.

F0. A vehicle, comprising:
  a structural component; and
  a decorative laminate applied to the structural component, the decorative laminate including:

a first laminate layer containing an anti-microbial agent;
a second laminate layer; and
a decorative layer disposed selectively between the first laminate layer and the second laminate layer;
wherein the first laminate layer and the second laminate layer each comprise a thermoplastic fluoropolymer material, and
wherein the first laminate layer, the decorative layer, and the second laminate layer are laminated together to form the decorative laminate.

F1. The vehicle of F0, wherein the anti-microbial agent is either a powdered metal or a phenolic.

F2. The vehicle of any of F0-F1, wherein the anti-microbial agent includes a bacteriostatic agent, a fungistatic agent, an antibiotic agent, a fungicide, or a combination thereof.

F3. The vehicle of any of F0-F2, further comprising a light source, and wherein the decorative layer includes one or more visible materials and one or more non-visible light activated materials that change from a non-visible state to a visible state when exposed to light emitted from the light source.

F4. The vehicle of any of F0-F3, wherein the decorative laminate layer includes one or more materials deposited in an alignment pattern that facilitates alignment of the decorative laminate when applied to the structural component.

G0. A method of displaying an image, comprising:
forming a decorative laminate by layering and laminating together at a specified heat and a specified pressure:
a first laminate layer having a transparent appearance and containing an anti-microbial agent,
a second laminate layer, and
a decorative layer including the image and disposed selectively between the first laminate layer and the second laminate layer;
curing a structural composite panel to form a cured structural composite panel; and
applying with an adhesive layer the decorative laminate to a bonding surface of the cured structural composite panel.

Advantages, Features, and Benefits

The different embodiments and examples of the decorative laminate described herein provide several advantages over known solutions for inhibiting microbial spread and/or growth on vehicle interior surfaces. For example, illustrative embodiments and examples described herein provide a permanent, durable anti-microbial material on surfaces frequently contacted by vehicle passengers and other microorganism carriers.

Additionally, and among other benefits, illustrative embodiments and examples described herein allow integration of anti-microbial functionality into an existing component, eliminating need for a separate installation or application process during vehicle assembly.

Additionally, and among other benefits, illustrative embodiments and examples described herein provide a highly customizable anti-microbial material, allowing use of complex decorative graphics and/or patterns while maintaining full anti-microbial coverage.

No known system or device can perform these functions, particularly in a material with low flammability, low vapor permeability, and strong resistance to weathering and staining. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A decorative laminate comprising:
a first laminate layer containing an anti-microbial agent;
a second laminate layer; and
a decorative layer disposed selectively between the first laminate layer and the second laminate layer;
wherein the first laminate layer and the second laminate layer each comprise a thermoplastic fluoropolymer material, and
wherein the first laminate layer, the decorative layer, and the second laminate layer are laminated together to form the decorative laminate configured for application to a structural component,
wherein the anti-microbial agent is distributed non-homogeneously in or on the first laminate layer in a configuration selected to preserve transparency of the first laminate layer.

2. The decorative laminate of claim 1 further comprising an adhesive layer disposed between the decorative laminate and a bonding surface of the structural component.

3. The decorative laminate of claim 1 further comprising one or more additional laminate layers adjacent a first side of the decorative layer.

4. The decorative laminate of claim 1 wherein the anti-microbial agent is powdered silver dispersed within the first laminate layer.

5. The decorative laminate of claim 1 wherein the decorative laminate includes a resin layer disposed on the second laminate layer, and wherein the resin layer includes one or more thermoset resin materials.

6. The decorative laminate of claim 1 wherein the structural component comprises a building interior structural component, a building structural composite panel, an aircraft interior structural component, a rotorcraft interior structural component, a spacecraft interior structural component, a watercraft interior structural component, an automobile interior structural component, or a truck interior structural component.

7. The decorative laminate of claim 1 wherein the anti-microbial agent is distributed in a pattern on or in the first laminate layer.

8. The decorative laminate of claim 1 wherein the anti-microbial agent is distributed in a grid pattern in or on the first laminate surface.

9. The decorative laminate of claim 1 wherein the first laminate layer has an outer surface and an inner surface, the anti-microbial agent being located closer to the outer surface than the inner surface.

10. The decorative laminate of claim 9 wherein the anti-microbial agent is applied on the outer surface.

11. The decorative laminate of claim 9 wherein the anti-microbial agent is printed on the outer surface.

12. The decorative laminate of claim 9 wherein the anti-microbial agent is coated on the outer surface.

13. A decorative laminate system comprising:
a structural component having a bonding surface;
a decorative laminate applied to the bonding surface of the structural component, the decorative laminate comprising:
a first laminate layer having a transparent appearance and containing an anti-microbial agent;
a second laminate layer having an opaque appearance, the first laminate layer and the second laminate layer each comprising a thermoplastic fluoropolymer material;
a decorative layer disposed between the first laminate layer and the second laminate layer;
a resin layer disposed on the second laminate layer;
an adhesive layer disposed between the decorative laminate and the bonding surface of the structural component; and
wherein the anti-microbial agent is distributed in or on the first laminate layer in a pattern selected to preserve transparency of the first laminate layer.

14. The decorative laminate system of claim 13 wherein the decorative laminate further comprises one or more additional laminate layers adjacent either a first side of the resin layer or a second side of the resin layer.

15. The decorative laminate system of claim 13 wherein the decorative layer includes one or more of an ink jet printed ink, a silk screen printed ink, a pigment-based ink, a dye-based ink, a paint, a stain, and a digital printed ink.

16. The decorative laminate system of claim 13 wherein the anti-microbial agent includes at least one of a bacteriostatic agent, a fungistatic agent, an antibiotic agent, a fungicide, or a combination thereof.

17. A vehicle, comprising:
a structural component; and
a decorative laminate applied to the structural component, the decorative laminate including:
a first laminate layer containing an anti-microbial agent;
a second laminate layer; and
a decorative layer disposed selectively between the first laminate layer and the second laminate layer;
wherein the first laminate layer and the second laminate layer each comprise a thermoplastic fluoropolymer material,
wherein the first laminate layer, the decorative layer, and the second laminate layer are laminated together to form the decorative laminate, and
wherein the anti-microbial agent is distributed in a concentration selected to preserve visibility of the decorative layer through the first laminate layer.

18. The vehicle of claim 17 wherein the anti-microbial agent is either a powdered metal or a phenolic.

19. The vehicle of claim 17 further comprising a light source, and wherein the decorative layer includes one or more visible materials and one or more non-visible light activated materials that change from a non-visible state to a visible state when exposed to light emitted from the light source.

20. The vehicle of claim 17 wherein the decorative layer includes one or more materials deposited in an alignment pattern that facilitates alignment of the decorative laminate when applied to the structural component.

* * * * *